A. D. LIGHTNER AND E. HOLMES.
VEHICLE LIFTING MEANS.
APPLICATION FILED MAY 13, 1918.
1,427,214.
Patented Aug. 29, 1922.
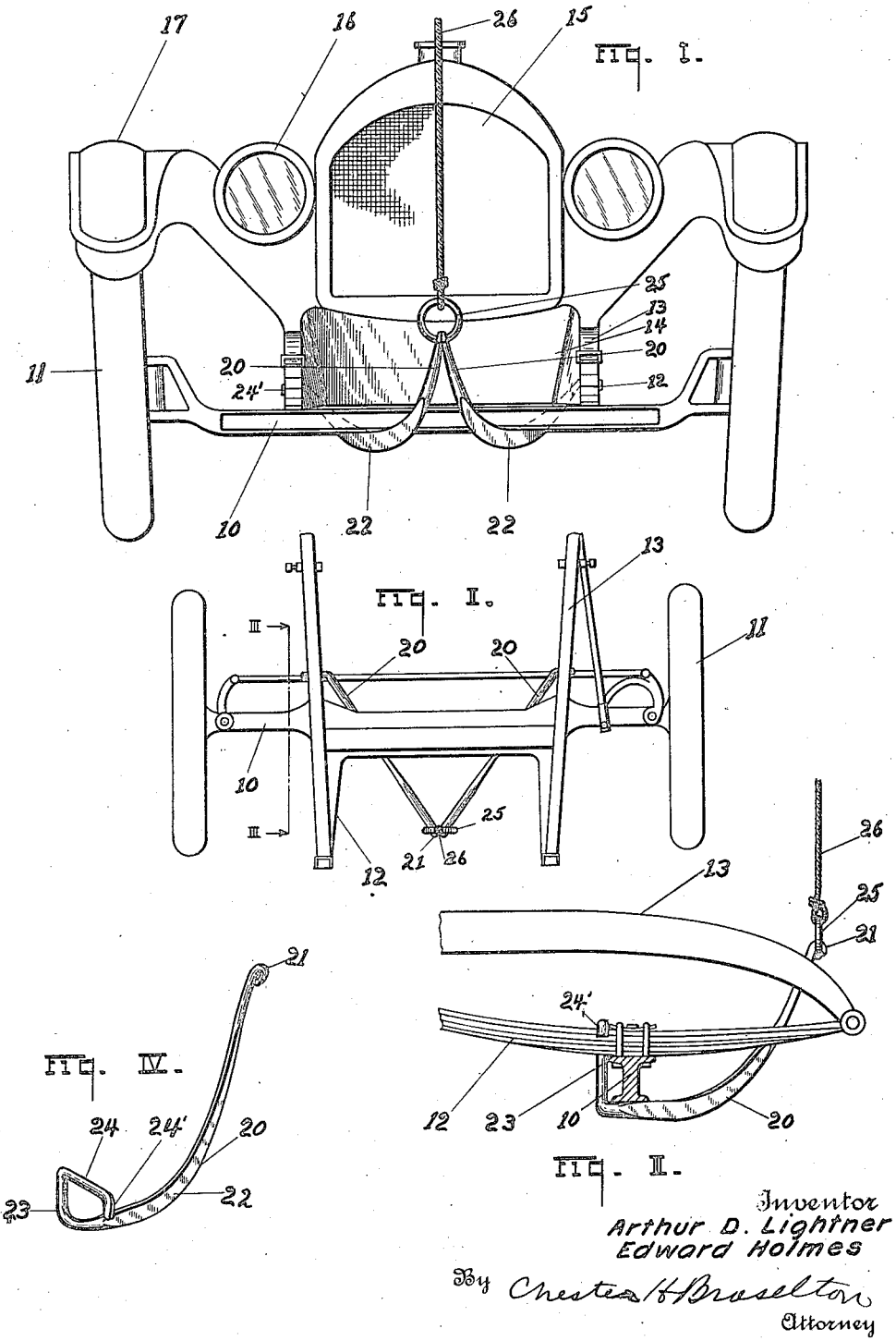
Inventor
Arthur D. Lightner
Edward Holmes
By Chester H Braselton
Attorney

UNITED STATES PATENT OFFICE.

ARTHUR D. LIGHTNER AND EDWARD HOLMES, OF TOLEDO, OHIO, ASSIGNORS TO THE WILLYS-OVERLAND COMPANY, OF TOLEDO, OHIO, A CORPORATION OF OHIO.

VEHICLE-LIFTING MEANS.

1,427,214. Specification of Letters Patent. Patented Aug. 29, 1922.

Application filed May 13, 1918. Serial No. 234,197.

*To all whom it may concern:*

Be it known that we, ARTHUR D. LIGHTNER and EDWARD HOLMES, citizens of the United States, residing at Toledo, in the county of Lucas and State of Ohio, have invented certain new and useful Improvements in Vehicle-Lifting Means, of which we declare the following to be a full, clear, and exact description.

This invention relates to improvements in vehicle lifting means and has for its primary object to provide improved devices adapted to be attached to the front of an automobile or other vehicle whereby the front of the vehicle can be lifted.

Further objects, and objects relating to economies of manufacture and details of construction, will definitely appear from the detailed description to follow:

The objects of the invention are accomplished by the devices and means described in the following specifications. The invention is thoroughly defined and pointed out in the appended claims.

A structure constituting a preferred embodiment of the invention is illustrated in the accompanying drawing, forming a part of this specification, in which:

Fig. I is a front elevation of an automobile and shows the invention when applied.

Fig. II is a plan view showing the front portion of the chassis and the front axle and wheels with the invention applied.

Fig. III is a vertical, cross-sectional view taken substantially on the line III—III of Fig. II.

Fig. IV is a perspective view of one of the improved lifting hooks.

Before proceeding with a detailed description of the invention, it is well to state that the hooks are particularly adapted for use in decking automobiles when it is desired to suspend one automobile over another, as for shipment in railroad cars. However, it is to be understood that the invention is not to be limited to this particular use.

The automobile illustrated in the accompanying drawing is of the ordinary type, having the axle 10 which carries the steering spindles on which the wheels 11 are mounted. Springs 12 are of the semi-elliptic type and are secured to the axle 10 and the chassis side members 13 in the usual manner, (Fig. II). An apron is indicated at 14 and above the apron is indicated a radiator 15. Headlights are indicated at 16 and mud guards at 17, (Fig. I).

The lifting device comprises two members 20 so formed that they are detachably secured to the front of the vehicle, as best shown in Figs. III and IV. Each of the securing members 20 is formed from a bar having its upper end, as shown in Fig. IV, slightly tapered, its lower end of substantially uniform diameter and the central portion intermediate its ends flattened as at 22. The bar is curved intermediate its ends and the top of the lower flat portion of the bar is substantially horizontal when the member is secured to the vehicle, as clearly shown in Fig. III. The lower end of the securing member, which has a substantially uniform diameter, is bent to form a laterally-extending hook which projects to one side of the member, the hook having a vertical portion 23, a horizontal portion 24 and a short, depending portion 24'. The hook of one of the members extends toward the right and the hook of the other member is similarly formed but extends toward the left. The tapered upper end of the securing member 20 is bent to form a hook 21 which is open to permit the insertion of a ring 25.

When it is desired to lift the front end of the vehicle, the lower hook of each member is hooked over a spring 12 on the left or right hand side of the vehicle, depending upon whether the hook extends from the right or the left, and the forward upper ends of the hooks are then raised so that the horizontal portion of the member immediately in front of the hook engages the lower edge of the axle 10. In this position of the securing members 20, their upper tapered ends converge and their hooks 21 are in contact. The ring 25 is then slipped into the hooks 21. By means of a cable 26 secured to the ring 25 the front of the automobile can be raised by a tackle or other suitable means. Of course, it is understood that suitable means are connected to the rear of the automobile for raising the same. The automobile can then be raised to any desired height.

It is evident that the invention provides a very simple and strong lifting means and any possibility of the same disengaging while the automobile is suspended is entirely eliminated, and the hooks on the lower end of each member, which hook over the springs of the automobile, have a rounded edge to engage the springs, and so will not mar the paint on the springs to an appreciable extent. The lifting members act as levers with the axle serving as a fulcrum. By constructing the members as above described, they may be easily and quickly attached and detached without the use of tools.

We are aware that our invention is susceptible of considerable variation without departing from the spirit thereof, and, therefore, we desire to claim the invention broadly, as well as specifically, as indicated by the appended claims.

Having thus described our invention, what we claim as new and desire to secure by Letters Patent, is:

1. A device for lifting automobiles, comprising two members converging at one end to a point and the other end of each member extending under the front axle and engaging the lower edge thereof; hooks on the last mentioned ends of said members adapted for hooking over the springs of said automobile; and detachable means for connecting the converging ends together.

2. A device for lifting automobiles, comprising two members converging at one end to a point and the other end of each member extending under the front axle and engaging the lower edge thereof; hooks on the last mentioned ends of said members adapted for hooking over the springs of said automobile; hooks formed on the upper ends of said members adapted for detachably receiving a ring, and means secured to said ring for lifting the said automobile.

3. A lifting device for an automobile, comprising a member having a left hand hook on one end and a member having a right hand hook on the corresponding end, the other ends converging toward the center of the automobile, the hooks being adapted to hook over the springs at one end of said automobile; a flattened portion on each member intermediate said ends, adapted to engage the under side of the axle of the automobile; and detachable means for connecting the converging ends together.

4. A lifting device having two angularly disposed portions adapted to engage the top and bottom sides of two angularly disposed members in such a manner as to be clamped upon one of said members by fulcruming upon the other.

5. A lifting device having two angularly disposed portions lying in planes substantially at right angles to each other, one of said portions comprising a hook and the other a fulcrum, said hook and fulcrum portions being adapted to engage the top and bottom sides of two members, one of which extends transversely of the other.

6. A lifting device comprising a body portion having an upstanding hook thereon, said body portion extending obliquely to the hook, said hook portion being adapted to extend over the top side of a member extending transversely of the axle of an automobile and said body portion being adapted to extend under the axle and to fulcrum thereon, whereby the hook is clamped upon said transversely extending member.

7. A lifting device comprising a member having portions at one end extending in transversely disposed planes, said portions being adapted to engage the top and bottom sides of two transversely arranged members to lift the same when force is applied in an upward direction upon the free end of said member.

8. A lifting device comprising two divergently arranged connected members each having on its outer end angularly disposed portions, one of which is adapted to engage the top and the other the bottom side of two load carrying members disposed in planes substantially at right angles to each other.

9. A lifting device comprising two divergently arranged connected members, the outer end of each of which is constructed to fulcrum upon the under side of a beam and to extend over another member disposed transversely of the beam.

10. A lifting lever comprising an arm having at one end a fulcrum portion and an angularly disposed portion, said fulcrum and angularly disposed portions being adapted to engage the bottom and top sides respectively, of two transversely extending members to support the same in suspended position.

11. A lifting lever comprising an arm having at one end two portions angularly disposed with respect to each other, both of which are angularly disposed with respect to the arm, and adapted to co-operate therewith to engage members extending transversely of each other to support the same in suspended position.

12. A lifting lever comprising an arm having at one end three portions, each of which is angularly disposed with respect to one other of said portions and all of which are angularly disposed with respect to the arm, said portions forming a hook adapted to co-operate with the arm to engage a plurality of members extending transversely of each other to support the same in suspended position.

In testimony whereof, they affix their signatures.

ARTHUR D. LIGHTNER.
EDWARD HOLMES.